United States Patent
Venugopal et al.

(10) Patent No.: US 12,481,872 B2
(45) Date of Patent: Nov. 25, 2025

(54) AUTOMATICALLY MIGRATING PROCESS CAPABILITIES USING ARTIFICIAL INTELLIGENCE TECHNIQUES

(71) Applicant: Dell Products L.P., Round Rock, TX (US)

(72) Inventors: Lokesh Venugopal, Georgetown, TX (US); Christina White, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 1346 days.

(21) Appl. No.: 17/154,341

(22) Filed: Jan. 21, 2021

(65) Prior Publication Data

US 2022/0229957 A1     Jul. 21, 2022

(51) Int. Cl.
*G06N 3/08*     (2023.01)
*G06F 8/70*     (2018.01)
*G06F 8/77*     (2018.01)
*G06F 30/27*    (2020.01)

(52) U.S. Cl.
CPC ............... *G06N 3/08* (2013.01); *G06F 8/70* (2013.01); *G06F 8/77* (2013.01); *G06F 30/27* (2020.01)

(58) Field of Classification Search
CPC .. G06N 3/08; G06N 3/088; G06F 8/70; G06F 8/77; G06F 30/27; G05B 2219/31343; G05B 19/4188
See application file for complete search history.

(56) References Cited

U.S. PATENT DOCUMENTS

| | | | |
|---|---|---|---|
| 10,691,653 B1 | 6/2020 | Aiken et al. | |
| 10,877,682 B2 | 12/2020 | Veluswamy et al. | |
| 2014/0365991 A1* | 12/2014 | Bhardwaj | G06Q 10/0639 717/102 |
| 2016/0253172 A1* | 9/2016 | Shani | G06F 8/70 717/101 |
| 2018/0046570 A1* | 2/2018 | Kaulgud | G06F 11/3672 |
| 2018/0239603 A1* | 8/2018 | Balestrazzi | G06Q 10/06 |
| 2018/0365612 A1* | 12/2018 | Spofford | G06Q 10/20 |
| 2019/0155712 A1* | 5/2019 | Tiwari | G06N 5/00 |
| 2019/0392329 A1 | 12/2019 | Rangarajan et al. | |

(Continued)

*Primary Examiner* — Noor Alkhateeb
(74) *Attorney, Agent, or Firm* — Ryan, Mason & Lewis, LLP

(57) ABSTRACT

Methods, apparatus, and processor-readable storage media for automatically migrating process capabilities using AI techniques are provided herein. An example computer-implemented method includes determining, for a process of an enterprise, process requirements by analyzing data related to the process and data related to the enterprise; generating a recommendation of process capabilities to be incorporated into the process by processing, using AI techniques, the analyzed data; forecasting behavior of the process in conjunction with portions of the recommended process capabilities by performing simulations of the process incorporating the portions of the recommended process capabilities; developing modified versions of the process, based on the forecasting, by migrating feature sets into portions of code associated with the process; testing the modified versions of the process by performing simulations of the modified versions; and deploying at least one of the modified versions of the process based on the testing.

20 Claims, 10 Drawing Sheets

(56) References Cited

U.S. PATENT DOCUMENTS

2020/0372576 A1* 11/2020 Sundaram .............. G06Q 40/02
2021/0182996 A1* 6/2021 Cella .................... G06Q 10/083
2021/0311859 A1* 10/2021 De Sousa Bispo .........................
G06F 11/3409

* cited by examiner

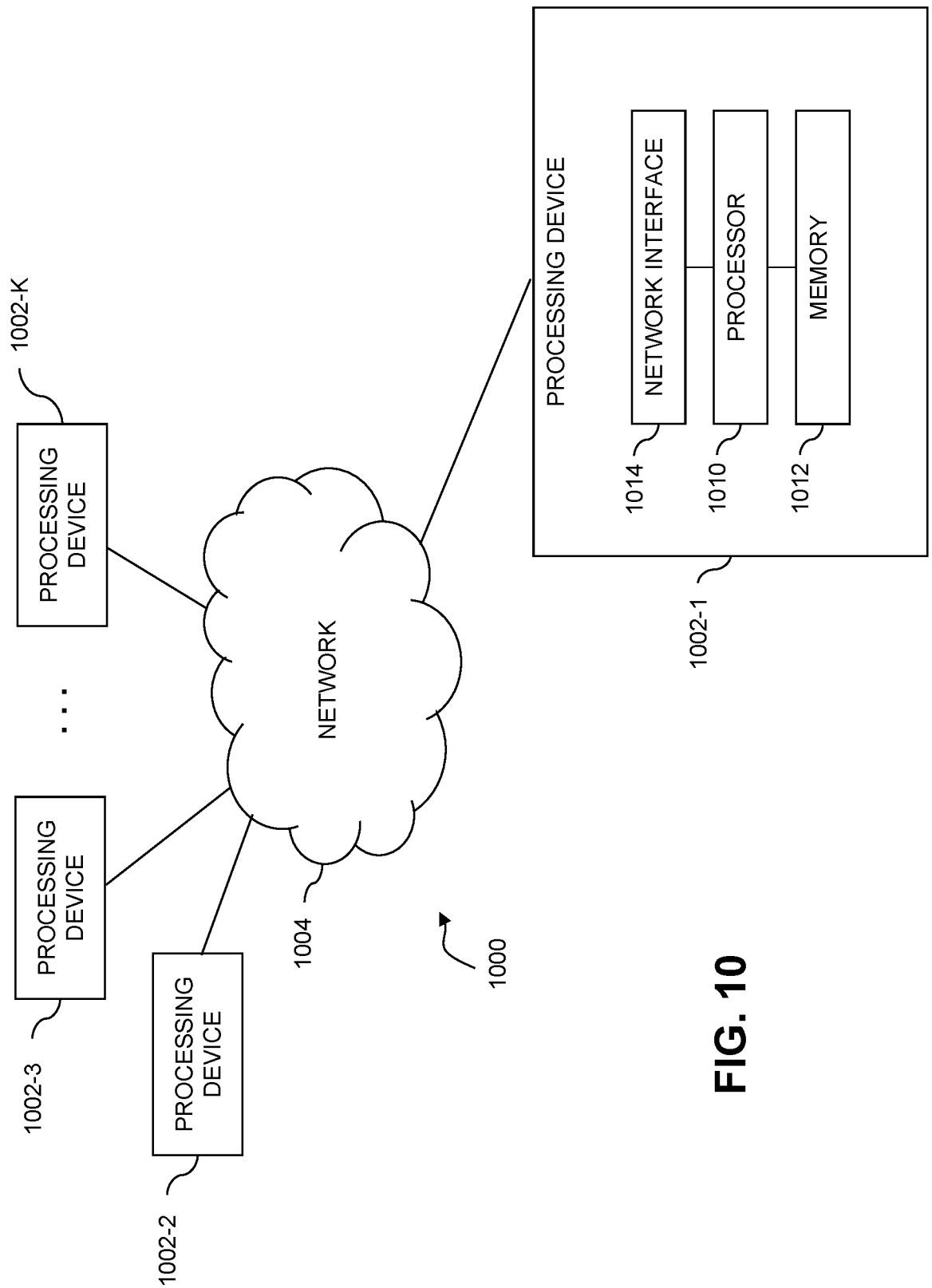

AUTOMATICALLY MIGRATING PROCESS CAPABILITIES USING ARTIFICIAL INTELLIGENCE TECHNIQUES

FIELD

The field relates generally to information processing systems, and more particularly to techniques for process management using such systems.

BACKGROUND

Technology transformations face many challenges in achieving full value and controlling costs. Conventional process management techniques typically involve information technology (IT) personnel spending significant amounts of time manually managing and tracking enterprise needs that change over the lifespans of given projects. Additionally, with such conventional techniques, larger transformation efforts can span years, and in this time, team members, processes, and enterprise needs often evolve. Process design inputs, testing activities, and performance evaluations, using conventional techniques, are often subjective and prone to communication errors. Accordingly, with conventional process management techniques relying heavily on manual gathering, tracking and testing of numerous requirements, outcomes can vary greatly according to the skill and discipline of the individuals assigned to the projects.

SUMMARY

Illustrative embodiments of the disclosure provide techniques for automatically migrating process capabilities using artificial intelligence (AI) techniques. An exemplary computer-implemented method includes determining, in connection with at least one process of a given enterprise, one or more process requirements by analyzing data related to the at least one process and data related to the given enterprise, and generating a recommendation of one or more process capabilities to be incorporated into the at least one process by processing, using one or more artificial intelligence techniques, at least a portion of the data related to the at least one process and data related to the one or more determined process requirements. The method also includes forecasting behavior of the at least one process in conjunction with at least a portion of the one or more recommended process capabilities by performing at least one simulation of the at least one process incorporating the at least a portion of the one or more recommended process capabilities. Additionally, the method includes developing one or more modified versions of the at least one process, based at least in part on the forecasting, by migrating one or more feature sets into one or more portions of code associated with the at least one process, and testing the one or more modified versions of the at least one process by performing at least one simulation of the one or more modified versions. Further, the method also includes deploying, to at least one processing environment associated with the given enterprise, at least one of the one or more modified versions of the at least one process based at least in part on the testing.

Illustrative embodiments can provide significant advantages relative to conventional process management techniques. For example, problems associated with error-prone and resource-intensive manual design and testing efforts are overcome in one or more embodiments through automatically migrating process capabilities using artificial intelligence techniques.

These and other illustrative embodiments described herein include, without limitation, methods, apparatus, systems, and computer program products comprising processor-readable storage media.

BRIEF DESCRIPTION OF THE DRAWINGS

FIGS. 9 and 10 show examples of processing platforms that may be utilized to implement at least a portion of an information processing system in illustrative embodiments.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
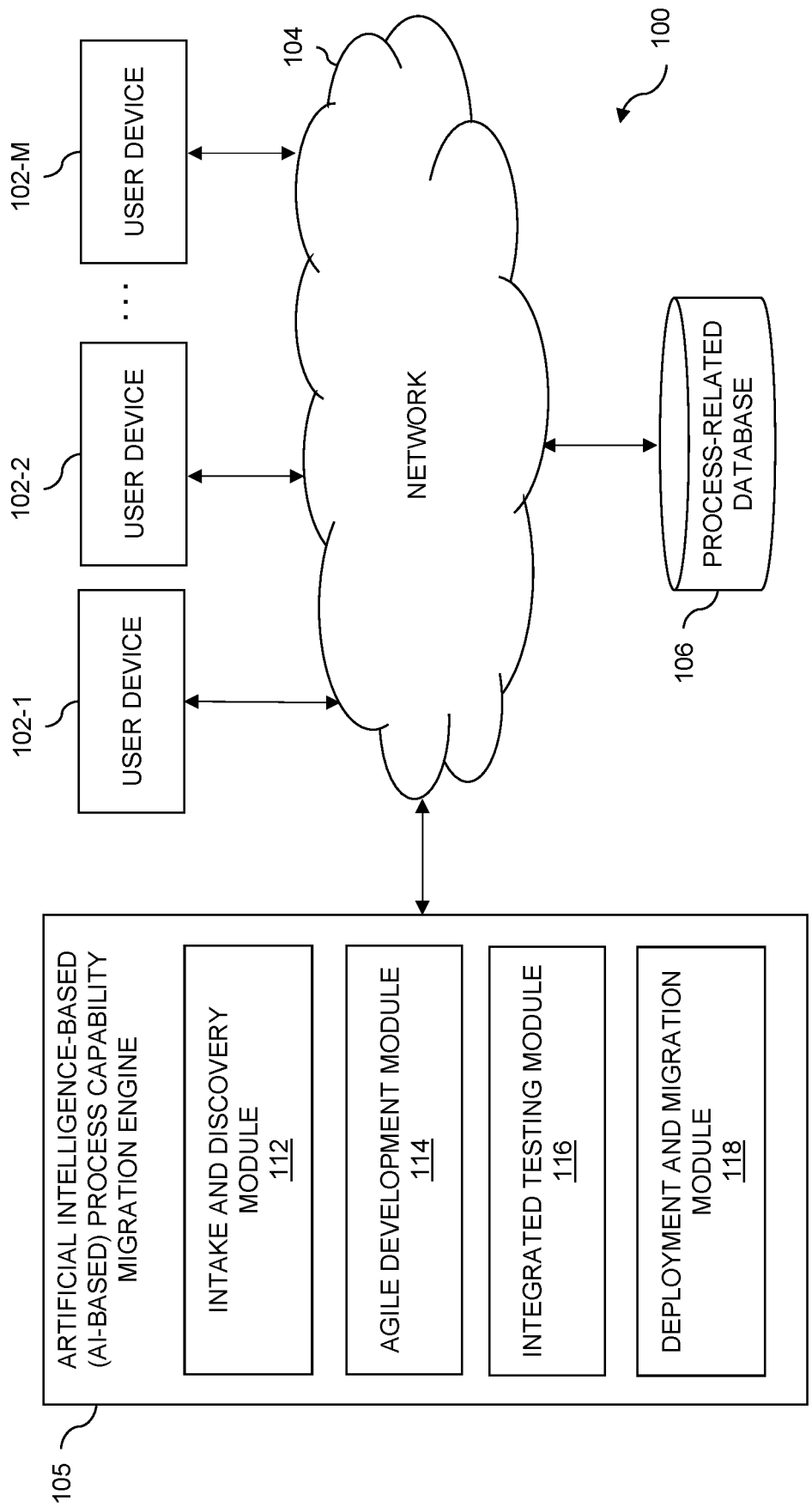
FIG. 1 shows an information processing system configured for automatically migrating process capabilities using artificial intelligence techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is AI-based process capability migration engine 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers," and such devices can host or otherwise contain a variety of systems and data sources, a further detailed herein.

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, AI-based process capability migration engine 105 can have an associated database 106 configured to store data pertaining to process-related information, which comprise, for example, usage data, deviation data, volume data, testing data, process-related enterprise data, feature set data, etc.

The database 106 in the present embodiment is implemented using one or more storage systems associated with AI-based process capability migration engine 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with AI-based process capability migration engine 105 can be one or more input-output devices, which illustratively comprise keyboards, displays or other types of input-output devices in any combination. Such input-output devices can be used, for example, to support one or more user interfaces to AI-based process capability migration engine 105, as well as to support communication between AI-based process capability migration engine 105 and other related systems and devices not explicitly shown.

Additionally, AI-based process capability migration engine 105 in the FIG. 1 embodiment is assumed to be implemented using at least one processing device. Each such processing device generally comprises at least one processor and an associated memory, and implements one or more functional modules for controlling certain features of AI-based process capability migration engine 105.

More particularly, AI-based process capability migration engine 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows AI-based process capability migration engine 105 to communicate over the network 104 with the user devices 102, and illustratively comprises one or more conventional transceivers.

The AI-based process capability migration engine 105 further comprises an intake and discovery module 112, an agile development module 114, an integrated testing module 116, and a deployment and migration module 118.

It is to be appreciated that this particular arrangement of modules 112, 114, 116, and 118 illustrated in the AI-based process capability migration engine 105 of the FIG. 1 embodiment is presented by way of example only, and alternative arrangements can be used in other embodiments. For example, the functionality associated with modules 112, 114, 116, and 118 in other embodiments can be combined into a single module, or separated across a larger number of modules. As another example, multiple distinct processors can be used to implement different ones of modules 112, 114, 116, and 118 or portions thereof.

At least portions of modules 112, 114, 116, and 118 may be implemented at least in part in the form of software that is stored in memory and executed by a processor.

It is to be understood that the particular set of elements shown in FIG. 1 for automatically migrating process capabilities using artificial intelligence techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, AI-based process capability migration engine 105 and process-related database 106 can be on and/or part of the same processing platform.

An exemplary process utilizing modules 112, 114, 116, and 118 of an example AI-based process capability migration engine 105 in computer network 100 will be described in more detail with reference to the flow diagram of FIG. 8.

Accordingly, at least one embodiment includes automatically migrating process capabilities using artificial intelligence techniques. Such an embodiment can include generating and/or implementing an AI-driven capability migration engine with a systemic requirements and process-based test case generator. As detailed herein, one or more embodiments include process-related technology transformations, which include a process-led technology development approach that embeds predictive and reactive AI techniques throughout each transformation. From discovery, to design, to release and/or deployment, process analysis and prediction techniques are integrated into an AI engine that provides integration from requirements definition and input to efficient agile development, to product testing, to low- or no-impact-based live migration into the transformation, in order to provide clarity to past and future process performance potential.

As illustrated, for example, in FIG. 1 and also further detailed herein, an AI engine implemented in one or more embodiments uses multiple modules to carry out various functions. For instance, an intake and discovery module assesses the current processes and gaps therein by analyzing information such as the current state process, one or more deviations, key performance indicator (KPI) misses, one or more factors, final revenue impact, etc. Additionally, user-related information, role-related information, and activity logs from each relevant system in the process arc are included to reveal the current uses, by team, of each function in addition to the volume of such usage and one or more items of scenario and/or context data. Using such automated intake, the AI engine of one or more embodiments recommends the (new) capabilities and technical elements required of the process and/or system. In such an embodiment, business and/or enterprise requirements are created to include the relevant role and activity, and activity volume information is used to weight the requirements with respect to one another.

Additionally, an AI engine of at least one embodiment includes an agile development module, which, as each feature set is developed and loaded into a test environment, assesses the feature set and performs internal simulation to project how the system will behave with the upcoming new feature set. This generated feedback, in one or more embodiments, can then be output to one or more developers to further customize and/or enhance the feature set.

Also, an AI engine of at least one embodiment includes an integrated testing module, which performs a simulation-based end-to-end automated execution process assessment, highlighting one or more bottlenecks in the process. The integrated testing module also predicts one or more potential customer experience impacts and/or changes due to a new feature, which further enhances the capability release.

Further, an AI engine of at least one embodiment includes a deployment and migration module, which assesses agent usage and the workflow(s) followed to evaluate "as executed" to the "as designed or expected" process. The deployment and migration module also provides one or more targeted recommendations that enable faster and/or more accurate adoption along with a low- or zero-impact-based rollout that is aided by at least one rollout feature of the AI engine.

Figure 2:
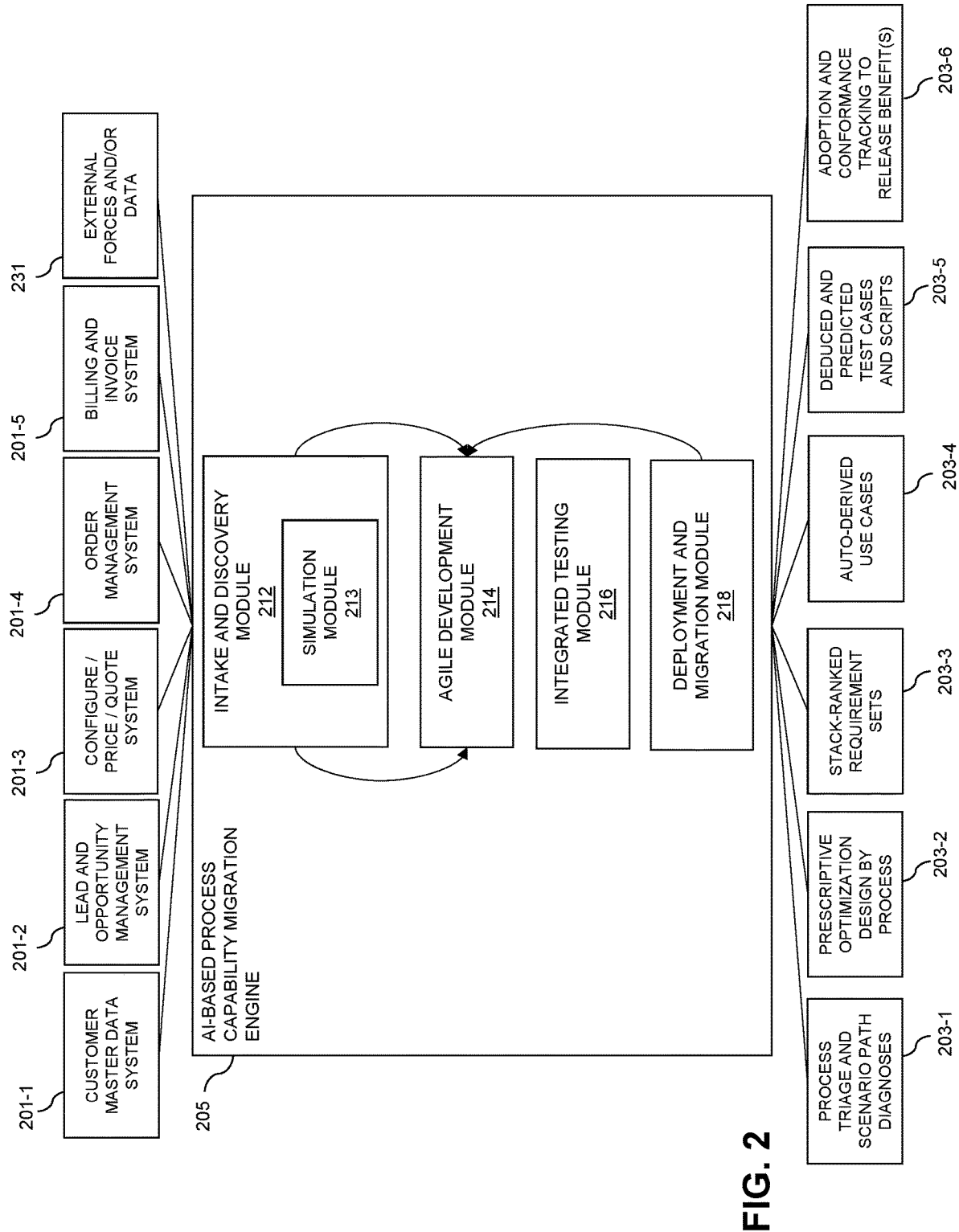
FIG. 2 shows an example workflow involving an information processing system configured for automatically migrating process capabilities using artificial intelligence techniques in an illustrative embodiment.

FIG. 2 shows an example workflow involving an information processing system configured for automatically migrating process capabilities using artificial intelligence techniques in an illustrative embodiment. As illustrated, such an embodiment provide perspective on the volumes and correlation of user activities to process outcomes (e.g., dollar values, utilization rates, cycle times, and other key performance indicators). Further, an example embodiment such as depicted in FIG. 2 systematically processes and simulates potential market changes, trends and/or directions to more effectively prepare the given process and/or system design.

As depicted in FIG. 2, the AI-based process capability migration engine 205 is an integrated AI model that targets from initial requirements gathering steps, to generating builds, to testing, to final migration outcomes. The AI-based process capability migration engine 205 has targeted modules (which are further detailed in connection with FIGS. 3-7) that can act in isolation or as an integrated package to deliver dynamic capability and migration-based outputs. For example, as illustrated in FIG. 2, inputs from various systems can be processed by intake and discovery module 212 within AI-based process capability migration engine 205. Such systems and sources providing input data, in the FIG. 2 example, can include a customer master data system 201-1, a lead and opportunity management (mgt) system 201-2, a configure/price/quote system 201-3, an order management system 201-4, and a billing and invoice system 201-5, as well as at least one data source related to external forces and/or context data 231. The intake and discovery module 212, based at least in part on processing the above-noted input data, and via use of simulation module 213, determines and outputs to agile development module 214, one or more strategic transformation priorities and one or more performance optimization recommendations. Such actions are further detailed below in connection with FIG. 3.

As also depicted in FIG. 2 and further detailed in connection with FIGS. 5-7, agile development module 214 generates one or more outputs which are used by integrated testing module 216, which generates one or more outputs used by deployment and migration module 218, which can provide feedback to agile development module 214 as well as facilitate the generation of various outputs from AI-based process capability migration engine 205. Such outputs, in the example embodiments depicted in FIG. 2, can include process triage and scenario path diagnoses 203-1, prescriptive optimization design by process 203-2, stack-ranked business requirement sets 203-3, auto-derived use cases 203-4, deduced and predicted test cases and scripts 203-5, and adoption and conformance tracking to release benefit 203-6.

Figure 3:
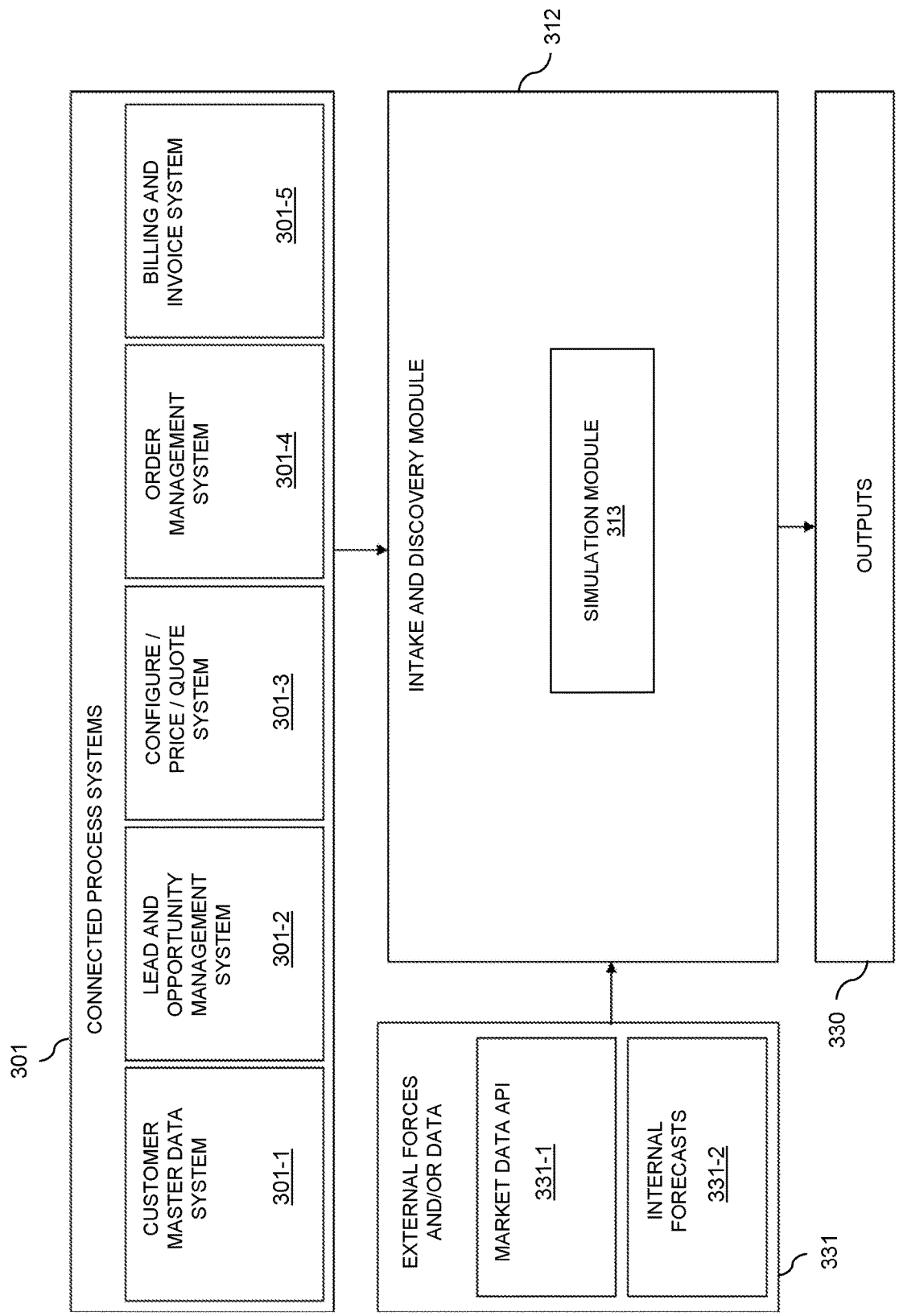
FIG. 3 shows an example workflow involving an intake and discovery module in an illustrative embodiment.

FIG. 3 shows an example workflow involving an intake and discovery module in an illustrative embodiment. As detailed herein, using the embedded intake and discovery module 312 of an AI-based process capability migration engine, requirements are distilled based at least in part on systemic process assessments through real-time current state process execution and gap assessments. End-to-end cycle time information, throughput time of each process block, wait time(s), escalations, service level agreement (SLA) misses, revenue misses, and other KPI misses are processed by at least one AI algorithm to produce and/or determine a set of requirements. In one or more embodiments, the requirements will be a subset of neural network weightings, wherein the recommended change in the input node requires and/or is enhanced by a change in the application or system. In one or more embodiments, a priority rank of the requirements can also be produced, for example, to assist in a budget cap-based finalization.

As specifically depicted in FIG. 3, intake and discovery module 312 captures and processes input data through direct connections with end-to-end systems and/or applications that comprise at least part of the given process journey. Similar to the example embodiment described above in connection with FIG. 2, such systems 301 providing input data, in the FIG. 3 example, can include a customer master data system 301-1 (which provides customer data, segment data, warranty data, master agreement information, etc.), a lead and opportunity management (mgt) system 301-2 (which provides opportunity-related data, case-related data, one or more forecasts, one or more notifications, etc.), a configure/price/quote system 301-3 (which provides quote and version information, pricing information, relevant coverage date information, service level information, etc.), an order management system 301-4 (which provides order-related data, entitlement data, relevant coverage date information, etc.), and a billing and invoice system 301-5 (which provides billing parameters, credit status information, invoicing preference information, etc.).

As also depicted in FIG. 3, intake and discovery module 312 captures and processes input data through at least one additional set of direct connections with external force and/or context data sources 331, which can include one or more market data APIs 331-1 (which provide market trend information, industry-related information, etc.) and internal forecast sources 331-2 (which provide strategic priority information, goal-related information, research and development information, etc.).

As further detailed herein, during an ongoing and iterative intake and discovery stage, at least a portion of such above-noted input data is analyzed (by intake and discovery module 312 and the simulation module 313 therein) in relation to its combined effect on internal processes and scenarios that comprise the user and enterprise journey, resulting in the intake and discovery module 312 generating outputs 330 that include identified process path categories as well as one or more recommendations and/or priorities. In one or more embodiments, the simulation module 313 considers the weight of the combined effects of each identified input, as noted above, and then changes one or more of the model assumptions (such as step order, capacity/staffing, speed of work, skill level, etc.) and runs all permutations to identify any key changes or combination of changes that could expect to see an increase in performance or efficiency. Such a simulation module can leverage existing business process model and notation (BPMN) capability to link the code and process changes, and then simulate the process across many iterations and combinations within the inputted ranges.

As noted above, path scenarios can be accompanied by distilled enterprise and/or process requirements and, where applicable, one or more test scenarios and one or more scripts. Such inputs then inform the recommended actions that should be considered, and, in one or more embodiments, an enterprise and or IT team can consider these outcomes and approve any changes, including reviewing and approving requirements for entry into an agile development module (as further detailed below).

Accordingly, in at least one embodiment, implementation of an intake and discovery module includes connecting the module to one or more sources of end-to-end system activity data. For example, in such an embodiment, system tables are linked to the intake and discovery module and mapped sequentially in accordance with the process and/or related customer journey. Such mapping can include identifying the unique identifier for each system, linking one or more tables within each source system to a main table containing the unique identifier, and linking cross-system main tables 1:n or n:1, such that one unique identifier in one table links to one or more identifiers in the main table of the upstream or downstream system.

Additionally, implementation of an intake and discovery module also includes aggregating and modeling an end-to-end process journey. In at least one embodiment, the intake and discovery module processes system data as detailed above, with historical logs providing the times and changes made. Such information is then fed into the engine which overlays all available date into a weighted, as-executed representation of the past process (that is, the analysis in modules 312 and 313 is for the end-to-end process and not just siloed processes).

Figure 4:
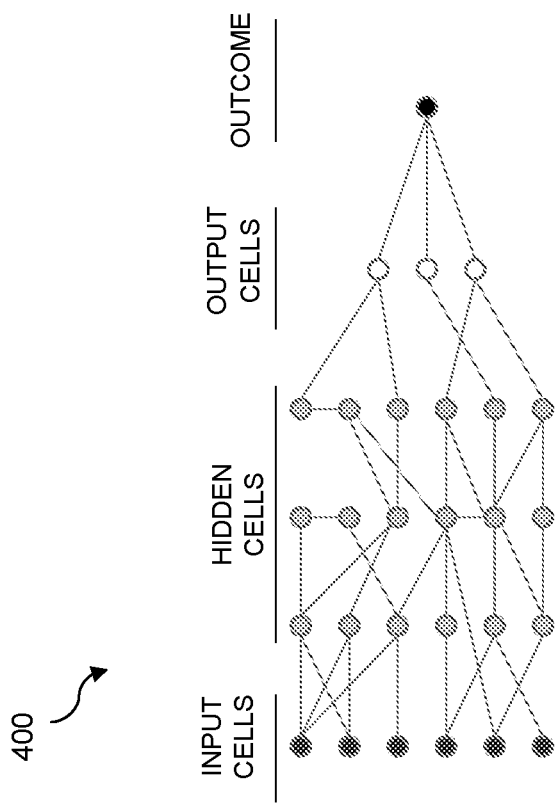
FIG. 4 shows an example extreme learning machine (ELM) neural network representation in an illustrative embodiment.

FIG. 4 shows an example ELM neural network representation in an illustrative embodiment. Such inputs, for example, as detailed above, as well as one or more activities performed and one or more generated outputs are included as input cells into neural network 400 (specifically, in the example embodiment depicted in FIG. 4, an ELM neural network comprising multiple input cells, hidden cells, and output cells) to determine the weighting of each activity and attribute value in relation to one or more outcomes, to cluster the process paths, and (as further detailed below) to inform feature learning.

As depicted in FIG. 4, input nodes are influenceable or non-influenceable nodes. When a node value change is flagged as resulting or likely to result in a better outcome, the model highlights the suggested change to be acted upon. For example, the neural network 400 may discover that when the difference between the quote date (input note) and the customer's financial calendar end (input node) is within a certain range, the sale is more likely to succeed with a more desirable margin. The model would then suggest optimizing the influenceable input node (quote date) to maximize this interaction. This also applies to other data components and interactions, wherein input nodes may include search capabilities, fields and objects, field values, form routings, etc.

In the above example, the outcome is sales margin. Output nodes that comprise this outcome can include, for example, being a successful sale (not lost) and having a healthy profit (margin). Other output nodes may be included as well, such as a customer survey satisfaction score, etc. In system design, this can expand to include efficiency measure outcomes, which are a product of measure of effort output nodes such as clicks, rejections, users per object, actions per sale, etc., with negative weightings often occurring on output measures and combinations of measures without direct link to value creation.

In at least one such embodiment, weightings are determined dynamically from within a neural network, across variables which can include, but are not limited to, conversion rate(s) across dimensions, rework rate(s) for one or more given activities as influenced by one or more relevant variables using linear and/or multivariate regression techniques, etc.

In accordance with one or more embodiments, implementation of an intake and discovery module can also include adding and/or incorporating one or more external industry and/or internal strategy-informed assumptions via BPMN simulation and at least one ELM (such as depicted in FIG. 4, for example). Such an embodiment can include processing market data from one or more relevant industry sources as well as data from internal revenue and market data source application programming interfaces (APIs), and incorporating one or more altered outcomes into process path determinations.

Accordingly, in one or more embodiments, implementation of an intake and discovery module can include determining process path categories. Using one or more regressions (such as noted above), variables are weighted by their correlation to the process outcome. For instance, in a situation wherein one variable (such as, for example, district) or multiple variables (such as, for example, district and the month that a quote is released to a customer) have a strong correlation to positive (or negative) conversion rates, these will be categorized accordingly. Once variables are weighted, the AI-based process capability migration engine will analyze the variables in the context (e.g., order) of the process and in connection with the frequency in which they occurred to identify one or more areas of concern (which are statistically significant).

Additionally, one or more process scenario families can be identified according to their performance. For example, process path categories can be determined to distinguish different path scenarios. By way merely of illustration, such path scenarios can include a first path with 100% visibility and no common failure points across cases, a second path with less than 100% visibility and some common failure points across cases, and a third path with less than 50% visibility and many common failure points across cases. Additionally, such path category determinations can be used to generate performance optimization recommendations and strategic transformation priorities. By way of example, performance optimization recommendations can include error fix recommendations, workflow enhancement recommendations, etc., while strategic transformation priorities can include transformation and/or migration designs for long-term planning, proactive design recommendations, etc.

Additionally, in one or more embodiments, implementation of an intake and discovery module can also include generating business requirements and test scenarios for relevant paths. Such an embodiment includes identifying roles and activities relevant to the concerned path as noted above. Using historical logs and activity tracking detail from one or more source systems, business requirements can be translated. If a given step is identified as an optimization potential (e.g., for a workflow enhancement), the corresponding requirement will be flagged for review and/or automatically upgraded with available simulation input (e.g., for quoting analysts, the discount field needs to be automatically updated based on the customer master agreement). Such determinations are informed at least in part by clustering ELM outputs. Further, test scenarios can be inferred from the most common process path scenarios and variants, as correlated to the relevant scenario being worked and/or enhanced.

Figure 5:
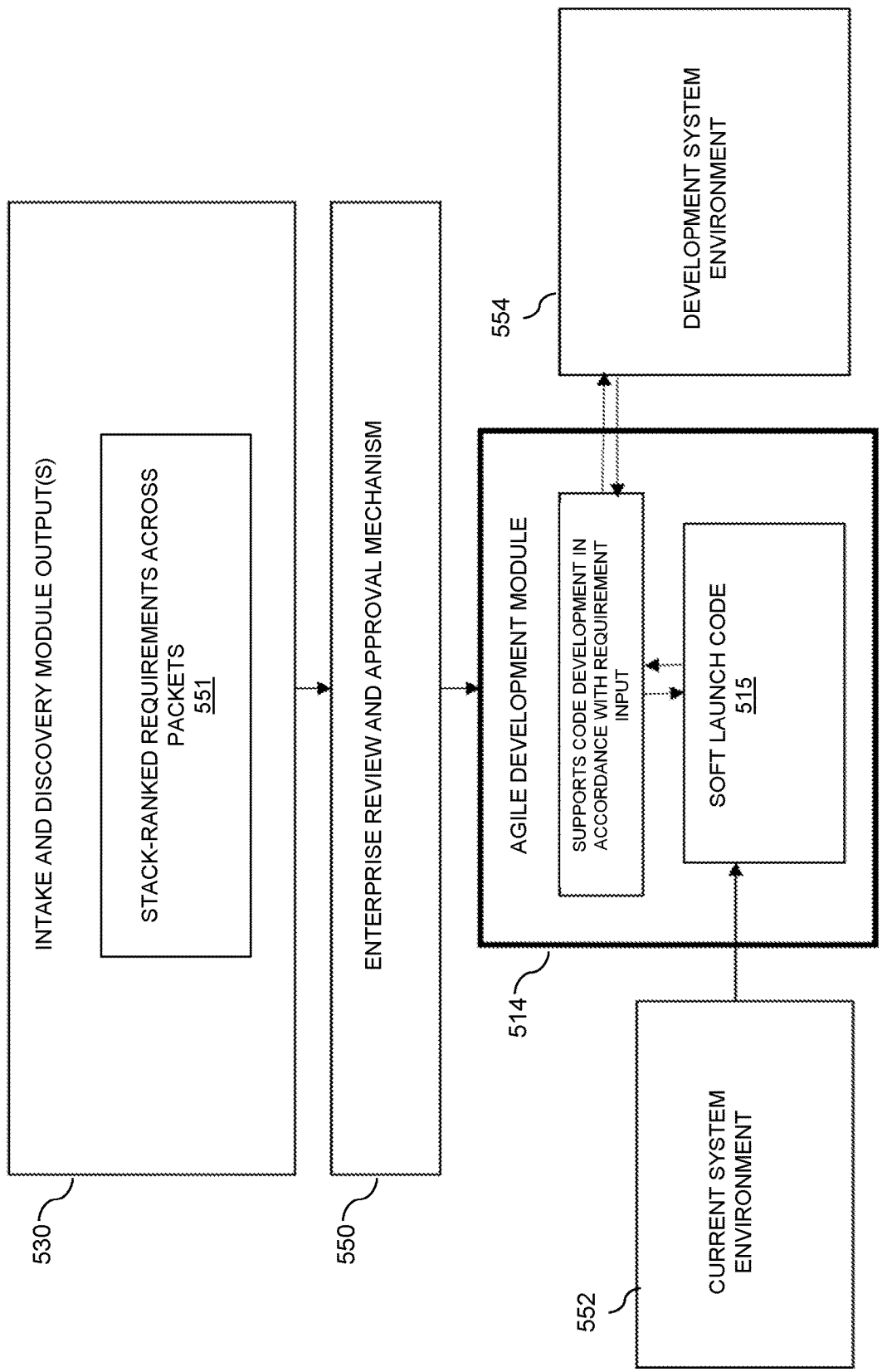
FIG. 5 shows an example workflow involving an agile development module in an illustrative embodiment.

FIG. 5 shows an example workflow involving an agile development module in an illustrative embodiment. By way of illustration, FIG. 5 depicts an enterprise review and approval mechanism 550, which processes intake and discovery module output(s) 530 (which can include stack-ranked requirements across packets 551, such as business/enterprise requirement details and context information, volume and scenario-related insights, impact information defined for prioritization and stack ranking, use cases and test scenario information, etc.). As used herein, stack ranking refers to information technology requirements prioritization based on criticality and the value that each requirement will bring (alone and in combination). Based at least in part on the processing of such output(s) 530, the review and approval mechanism 550 provides information pertaining to the reviewed and approved requirements to agile development module 514, which includes soft launch code 515. Having already learned the range and weighting of input nodes, the model is well-positioned to help determine testing and evaluate outcomes. Before code is released to the test environment for humans to interact with and examine, the soft launch code 515 (i.e., code that has not yet been tested by users in user acceptance testing) can be evaluated using this model.

The soft launch code 515 receives and processes information (e.g., surrounding processes, KPIs, volumes, etc., including prioritized and combined inputs identified in the upstream discovery module nodes) from at least one current system environment 552, and assess fit with the current system environment 552, iterating the processing step as needed. Further, agile development module 514 supports code development in accordance with the requirement input (s) (e.g., from review and approval mechanism 550), and ultimately outputs developed code to a development system environment 554.

Accordingly, in one or more embodiments, an agile development module, embedded within AI-based process capability migration engine, provides flexibility and dynamism to technology systems and/or teams, as the module is integrated into development work. For example, as components and/or elements of a feature are developed, at least one embodiment (via an agile development module) includes automatically pulling the new process and, via a backend simulation model, assessing the fit of the new code to the larger process. If any anomalies, errors, and/or incorrect designs are seen or discovered, such an embodiment includes taking one or more automated actions (e.g., alerting a developer entity and enabling a real-time opportunity to fix the code even before it gets rolled out to test). In at least one embodiment, the module also provides a platform that developers can access, via an integrated simulation view, to ensure that the requirement set can be experienced.

Figure 6:
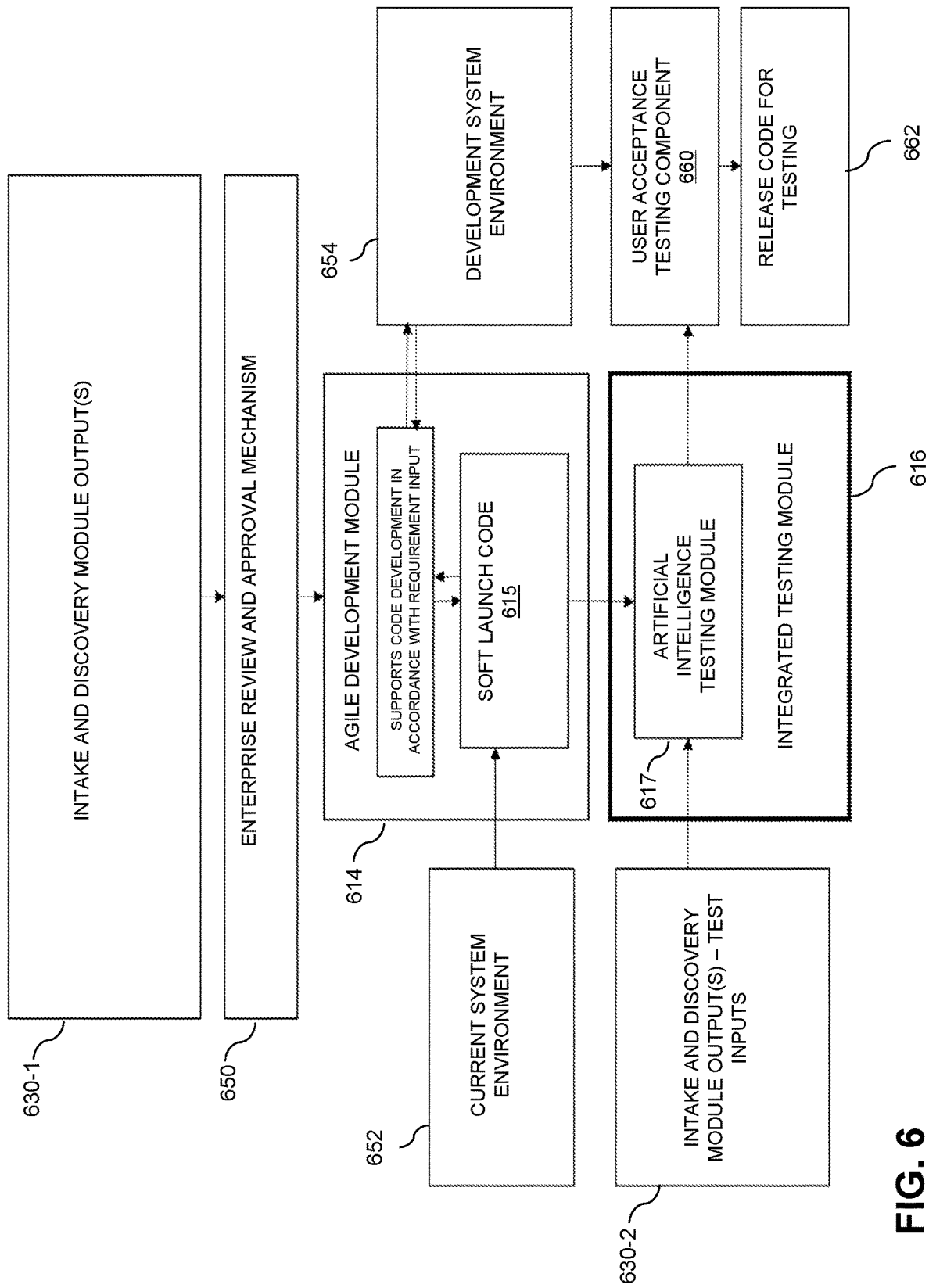
FIG. 6 shows an example workflow involving an integrated testing module in an illustrative embodiment.

FIG. 6 shows an example workflow involving an integrated testing module in an illustrative embodiment. By way of illustration, FIG. 6 depicts a number of elements that are similar to elements depicted in FIG. 5; for example, intake and discovery module output 630-1 is similar to element 530 in FIG. 5, review and approval mechanism 650 is similar to element 550 in FIG. 5, current system environment 652 is similar to environment 552 in FIG. 5, agile development module 614 (and soft launch code 615) is similar to module 514 (and code 515) in FIG. 5, and development system environment 654 is similar to environment 554 in FIG. 5. In addition to these elements, FIG. 6 also depicts integrated testing module 616, which includes an AI-testing module 617. Based at least in part on inputs from soft launch code 615 and additional intake and discovery module output(s) 630-2 (which include test or testing inputs such as scripts, use cases, test scenarios, etc.), the AI-testing module 617 leverages a simulation module to upscale test volume and variation. In one or more embodiments, the AI-testing module 617 uses a combination of neural network-identified inputs (including process step order, time range, etc.) and outcome measures, as well as the upcoming code being launched to iterate on user-defined and situation-defined input values to ensure that all test scenarios are included. As the tests are simulated (e.g., via the simulation module 313 described in connection with FIG. 3), the outcome measure is monitored. The simulator simulates the process but cannot determine the full outcome, as, for example, the success of a sale includes customer variability. Instead, these process performance metrics from the test runs are entered as input nodes back into the neural network for a full-circle outcome prediction. Defects that detrimentally impact this sequence are flagged and prioritized relative to the predicted impact.

Additionally, the AI-testing module 617 provides output to a user acceptance testing (UAT) component 660, which, based in part on proactively generated test guidance and/or input(s) from the development system environment 654, releases the code (i.e., pre-vetted code) 662.

Accordingly, using an integrated testing module, embedded within AI-based process capability migration engine, the testing direction to test systems is automatically fed by the module, providing detailed, step-by-step process-based test cases which can span multiple scenario-based permutations and/or combinations (e.g., the module can recreate a real-world customer-driven sales process based on historical process insights). In one or more embodiments, such functionality provides the maximum number of possible test cases covering the maximum number of possible scenarios. Discovered defects are then auto-prioritized by the integrated testing module based at least in part on the calculated impact (calculated, for example in relation to the current state of prioritization based on user feel). In at least one embodiment, using the insights and weightings initially identified in the discovery module, the relative impact to the outcome (e.g., order efficiency) is determined with and/or without the feature being fully functional. This potential range of negative impact is then compared across all defects and the defects are again prioritized for action in the same manner as the initial requirement prioritization and/or stack ranking. For example, a missing or mis-performing search feature causes the order process to take seven minutes longer due to an alternate or a manual search. Another defect might be correlated with data inaccuracies and adds five minutes to the process and decreases sales success chances by 0.04%. The output nodes and weighted outcome measures would determine which of these has priority.

In one or more embodiments, functionalities of the integrated testing module are further enhanced using volume information and variations of the process used in the current state, which facilitates increased focus and thoroughness of test definitions. Additionally, in such an embodiment, predictive test scenarios are deduced by one or more AI algorithms and used to test what will be in the future state. More specifically, in such an embodiment, predictive test scenario definition determination is a calculated via a balance of scenarios and iterations which span the range of inputs and outcomes. By way merely of illustration, in a sales success outcome example, such a model would pre-filter proportional scenarios across a range of outcomes (i.e., bucket 1=sales scores of 90-100, bucket 2=scores of 70-89, etc.). Scenarios and their historical input values are then randomly selected from the discovery module outputs that fit each of these outcome ranges. In this way, the model provides a more thorough sample of potential (not simply the most likely or top of mind) scenarios that fully test the upcoming functionality.

In at least one embodiment, such analysis performed by the integrated testing module is iterative and is accomplished through a BPMN-based multiple case simulator engine. In such an embodiment, this universal process language is the same as used in the intake and discovery module above to represent the end-to-end process paths and variants down to the activity level. The inputs and the results also constitute new input nodes into at least one ELM engine, as detailed above, so that there are two levels of output: the BPMN simulation, and the multivariate ELM weightings and cluster insights.

Figure 7:
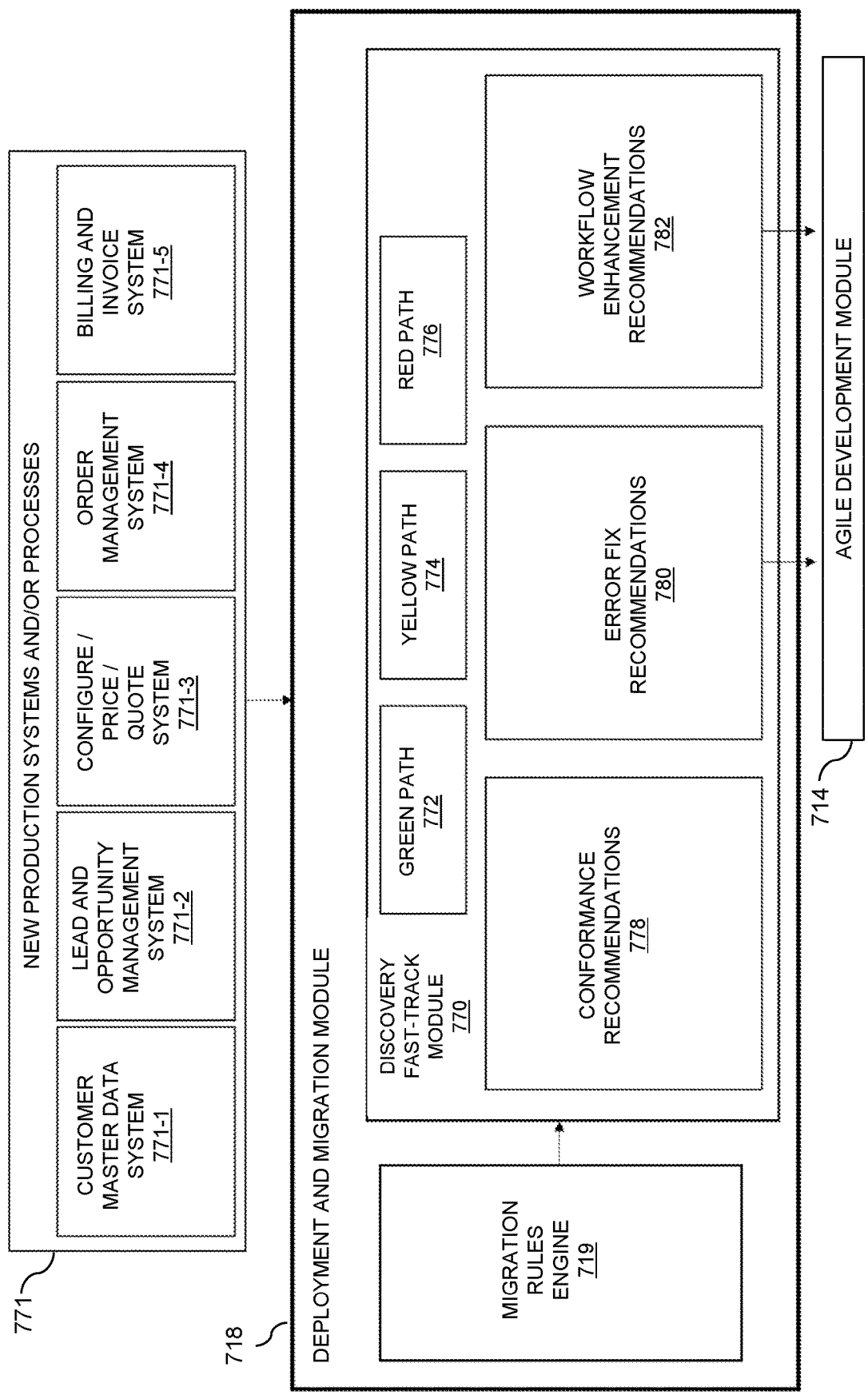
FIG. 7 shows an example workflow involving a deployment and migration module in an illustrative embodiment.

FIG. 7 shows an example workflow involving a deployment and migration module in an illustrative embodiment. By way of illustration, FIG. 7 depicts a set of new production systems and/or processes 771 with newly-released functionality (e.g., updated versions of previous systems and/or processes (for example, elements 201 and 301 in FIG. 2 and FIG. 3, respectively) as a result changes made via the agile development module and validated via the integrated testing module), wherein such new systems and/or processes include a customer master data system 771-1 (which includes customer data, segment data, warranty data, master agreement information, etc.), a lead and opportunity management (mgt) system 771-2 (which includes opportunity-related data, case-related data, one or more forecasts, one or more notifications, etc.), a configure/price/quote system 771-3 (which includes quote and version information, pricing information, relevant coverage date information, service level information, etc.), an order management system 771-4 (which includes order-related data, entitlement data, relevant coverage date information, etc.), and a billing and invoice system 771-5 (which includes billing parameters, credit status information, invoicing preference information, etc.).

As also depicted in FIG. 7, information input from the set of systems and/or processes 771 is processed by deployment and migration module 718, which carries out performance tracking of new processes and/or functions, leveraging one or more capabilities of the intake and discovery module. More specifically, deployment and migration module 718 includes a migration rules engine 719 and a discovery fast-track module 770, which includes conformance recommendations 778 (e.g., recommendations to enhance and/or reinforce training, to align one or more KPIs to desired outcomes, etc.), error fix recommendations 780 (e.g., information including defect definitions and data, fast-track warranty period fixes, business requirement details and context, volume and scenario insights, impact(s) defined for prioritization and stack ranking, use cases and test scenarios, etc.), and workflow enhancement recommendations 782 (e.g., recommended business and/or process logic changes, business/enterprise requirement details and context, volume and scenario insights, impact(s) defined for prioritization and stack ranking, use cases and test scenarios, etc.). At least a portion of the data from the discovery fast-track module 770 (e.g., portions of error fix recommendations 780 and workflow enhancement recommendations 782) are output to agile development module 714 for incorporation and/or processing (e.g., in the manner of a feedback loop).

In order to ensure, for example, that this model does not take for granted the completeness of the inputs, one or more embodiments include continually reviewing and expanding process connections. To this point, there is a concurrent categorization that complements and enhances such an engine. Looking across processes, the processes can fall into multiple example categories, including green path scenarios 772, yellow path scenarios 774, and red path scenarios 776.

In an example embodiment, green path scenarios 772 encompass all of the following aspects: 100% visible and/or digitalized, with no manual off-roads; no common failure points across cases; no functionality gaps; standardized process path(s) across the business with value-add variants only; and no improvements identified after running all available simulations. Green path processes should not require significant additional work once connected outside of the actions already described in the model. Additionally, in such an example embodiment yellow path scenarios 774 encompass one or more of the following aspects: less than 100% visible and/or digitalized; some common failure points across cases; and many variants without clear value justification. Yellow path scenarios should be kept top of mind, and where processes are not connected to the model, the inputs and relationships cannot be fully included in the model. Also, with yellow path scenarios, analysts must remember to adjust assumptions and confidence levels accordingly, and model owners should strive to improve these and move them to the green path.

Further, in such an example embodiment, red path scenarios 776 encompass one or more of the following: less than 50% visible and/or digitalized; many common failure points across cases; and no standardized process path and/or primary path has interruptions, failure points, or bottlenecks.

Like yellow path scenarios 774, red path scenarios 776 are also likely to be elements not yet visible in the model and should be the focus of improvement and integration.

At least one embodiment can also include future path scenarios, which encompass predicted process needs based at least in part on simulation(s) of an existing process combined with internal strategy and/or external market data. Future path scenarios can be aspirational and/or forward looking, and are best explored through simulation, capitalizing on the same sampling intelligence as the predictive scenario testing detailed herein when exploring assumptions and running simulations.

Accordingly, using a deployment and migration module, embedded within AI-based process capability migration engine, user groups and geographies are selected based on a simulation prediction. These migrated user groups are then studied in real-time to understand their adoption and any process bottlenecks they are facing in order to recommend one or more immediate adoption plan changes. Gaps are then categorized and actioned accordingly.

As such, in one or more embodiments, implementing such an AI-based process capability migration engine, an optimal adoption strategy is enabled along with accurate measurement of both internal and user/customer-centric metrics. Any additional fixes can be identified in real-time and prioritized for enhancement before rolling out to a larger user population. Example use cases for implementing one or more such embodiments can include quoting discovery, policy variance request process and/or system discovery, new system adoption deployment and migration, etc.

It is to be appreciated that, while detailed separately herein in accordance with at least one example embodiment, in one or more embodiments, the components and functionalities depicted in FIGS. 3-7 can be connected and/or part of the same processing platform and/or system.

Figure 8:
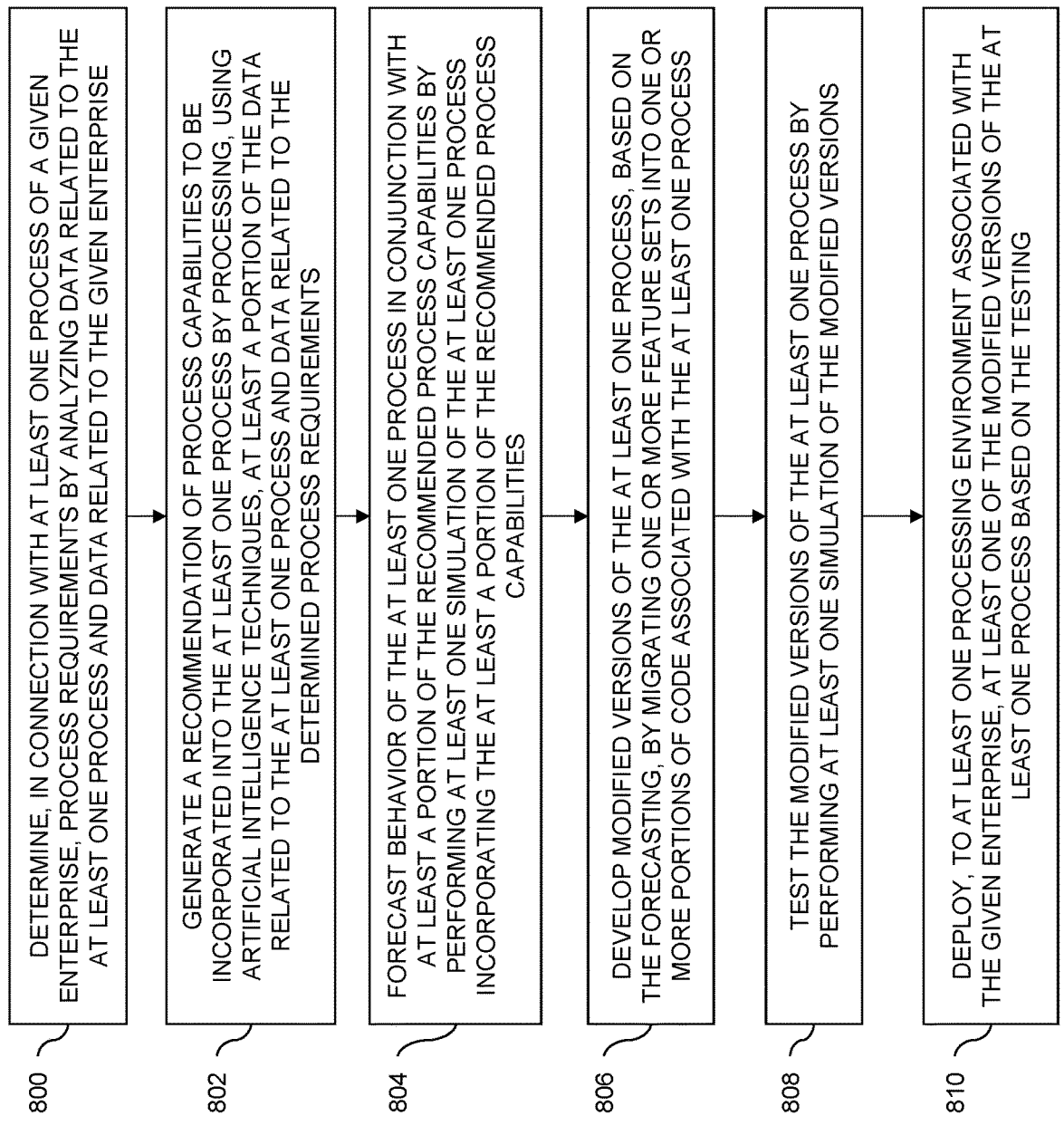
FIG. 8 is a flow diagram of a process for automatically migrating process capabilities using artificial intelligence techniques in an illustrative embodiment.

FIG. 8 is a flow diagram of a process for automatically migrating process capabilities using artificial intelligence techniques in an illustrative embodiment. It is to be understood that this particular process is only an example, and additional or alternative processes can be carried out in other embodiments.

In this embodiment, the process includes steps 800 through 810. These steps are assumed to be performed by AI-based process capability migration engine 105 utilizing modules 112, 114, 116, and 118.

Step 800 includes determining, in connection with at least one process of a given enterprise, one or more process requirements by analyzing data related to the at least one process and data related to the given enterprise. In one or more embodiments, determining one or more process requirements includes determining multiple process requirements and weighting each of the determined process requirements relative to one or more of the other determined process requirements based at least in part on activity volume information related to determined process requirements. Additionally or alternatively, analyzing data related to the at least one process can include analyzing data pertaining to one or more of one or more process deviations, one or more key performance indicator failures, and one or more outcome-related impacts, and analyzing data related to the given enterprise can include analyzing data pertaining to one or more of user information, role information, activity log information, volume information, and context information.

Step 802 includes generating a recommendation of one or more process capabilities to be incorporated into the at least one process by processing, using one or more artificial intelligence techniques, at least a portion of the data related to the at least one process and data related to the one or more determined process requirements. In at least one embodiment, processing at least a portion of the data related to the at least one process and data related to the one or more determined process requirements includes processing, using at least one neural network, at least a portion of the data related to the at least one process and data related to the one or more determined process requirements. In such an embodiment, the at least one neural network includes at least one ELM neural network. Additionally or alternatively, in such an embodiment, using the using at least one neural network comprises calculating weightings of multiple process capabilities in relation to one or more process-related variables.

Step 804 includes forecasting behavior of the at least one process in conjunction with at least a portion of the one or more recommended process capabilities by performing at least one simulation of the at least one process incorporating the at least a portion of the one or more recommended process capabilities. In one or more embodiments, forecasting behavior of the at least one process includes generating and outputting, to one or more of at least one system of the given enterprise and one or more entities within the given enterprise, feedback responsive to the at least one simulation.

Step 806 includes developing one or more modified versions of the at least one process, based at least in part on the forecasting, by migrating one or more feature sets into one or more portions of code associated with the at least one process.

Step 808 includes testing the one or more modified versions of the at least one process by performing at least one simulation (e.g., at least one end-to-end process simulation) of the one or more modified versions. In at least one embodiment, testing the one or more modified versions of the at least one process includes predicting one or more user experience impacts as a result of at least a portion of the one or more migrated feature sets and/or identifying one or more bottlenecks in execution of at least one of the one or more modified versions of the at least one process.

Step 810 includes deploying, to at least one processing environment associated with the given enterprise, at least one of the one or more modified versions of the at least one process based at least in part on the testing.

The techniques depicted in FIG. 8 can also include training the one or more artificial intelligence techniques based at least in part on the testing of the one or more modified versions of the at least one process.

Accordingly, the particular processing operations and other functionality described in conjunction with the flow diagram of FIG. 8 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically migrate process capabilities using artificial intelligence techniques. These and other embodiments can effectively overcome problems associated with error-prone and resource-intensive manual design and testing efforts.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. Although described in the context of system 100, these platforms may also be used to implement at least portions of other information processing systems in other embodiments.

Figure 9:
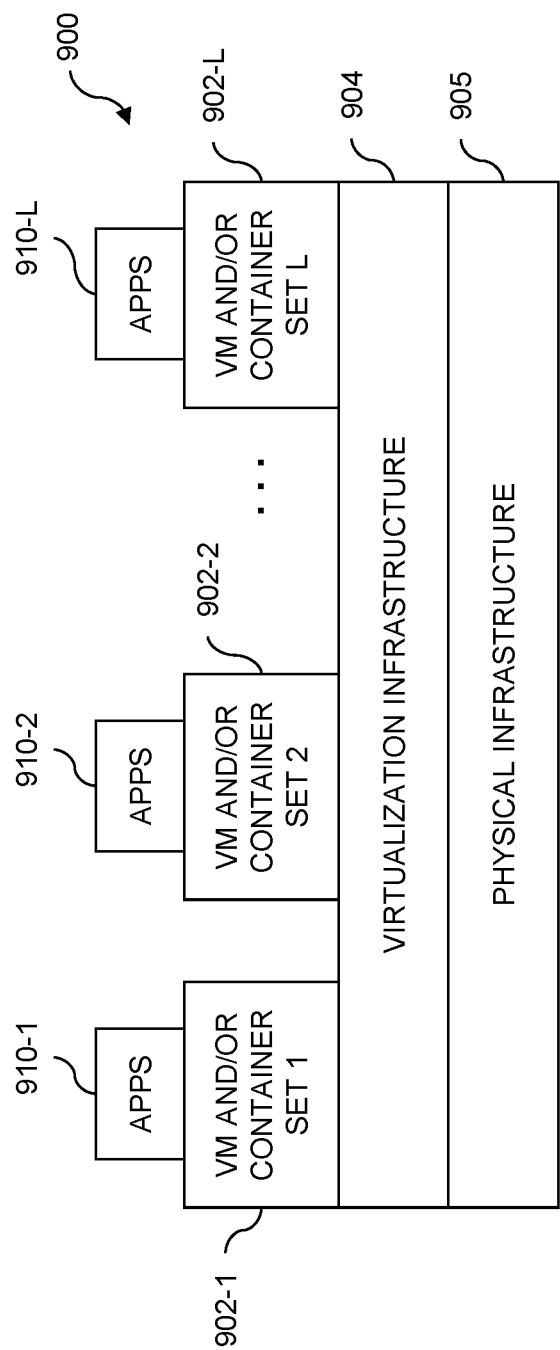

FIG. 9 shows an example processing platform comprising cloud infrastructure 900. The cloud infrastructure 900 comprises a combination of physical and virtual processing resources that are utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 comprise respective VMs, respective sets of one or more containers, or respective sets of one or more containers running in VMs. In some implementations of the FIG. 9 embodiment, the VMs/container sets 902 comprise respective VMs implemented using virtualization infrastructure 904 that comprises at least one hypervisor.

A hypervisor platform may be used to implement a hypervisor within the virtualization infrastructure 904, wherein the hypervisor platform has an associated virtual infrastructure management system. The underlying physical machines comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1002-1 in the processing platform 1000 comprises a processor 1010 coupled to a memory 1012.

The processor 1010 comprises a microprocessor, a microcontroller, an application-specific integrated circuit (ASIC), a field-programmable gate array (FPGA) or other type of processing circuitry, as well as portions or combinations of such circuitry elements.

The memory 1012 comprises random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
    determining, in connection with at least one process of a given enterprise, one or more process requirements by analyzing data related to the at least one process and data related to the given enterprise;
    generating a recommendation of one or more process capabilities to be incorporated into the at least one process by processing, using one or more neural networks, at least a portion of the data related to the at least one process and data related to the one or more determined process requirements, and calculating, using at least a portion of the one or more neural networks and one or more multivariate regression techniques, weightings of multiple process capabilities in relation to one or more designated process-related variables;
    forecasting behavior of the at least one process, in conjunction with at least a portion of the one or more recommended process capabilities and at least a portion of the calculated weightings, by performing at least one simulation of the at least one process incorporating the at least a portion of the one or more recommended process capabilities in association with one or more process performance metrics, and predicting one or more process behavior outcome measures by processing the one or more process performance metrics using the one or more neural networks;
    automatically generating one or more modified versions of the at least one process, based at least in part on the forecasting, by migrating, from at least one automated code development system, one or more feature sets into one or more portions of code associated with the at least one process, in at least one automated testing system, and incorporating the at least a portion of the one or more recommended process capabilities into at least a portion of the one or more modified versions of the at least one process based at least in part on the at least one simulation;
    testing the one or more modified versions of the at least one process by performing one or more simulations of the one or more modified versions; and
    deploying, to at least one processing environment associated with the given enterprise, at least one of the one or more modified versions of the at least one process based at least in part on the testing;
    wherein the method is performed by at least one processing device comprising a processor coupled to a memory.

2. The computer-implemented method of claim 1, wherein the one or more neural networks comprise at least one extreme learning machine (ELM) neural network.

3. The computer-implemented method of claim 1, further comprising:
 training the one or more neural networks based at least in part on the testing of the one or more modified versions of the at least one process.

4. The computer-implemented method of claim 1, wherein forecasting behavior of the at least one process comprises generating and outputting, to one or more of at least one system of the given enterprise and one or more entities within the given enterprise, feedback responsive to the at least one simulation.

5. The computer-implemented method of claim 1, wherein determining one or more process requirements comprises determining multiple process requirements and weighting at least a given one of the multiple determined process requirements relative to one or more other ones of the multiple determined process requirements based at least in part on activity volume information related to determined process requirements.

6. The computer-implemented method of claim 1, wherein testing the one or more modified versions of the at least one process comprises predicting one or more user experience impacts as a result of at least a portion of the one or more migrated feature sets.

7. The computer-implemented method of claim 1, wherein testing the one or more modified versions of the at least one process comprises identifying one or more bottlenecks in execution of at least one of the one or more modified versions of the at least one process.

8. The computer-implemented method of claim 1, wherein analyzing data related to the at least one process comprises analyzing data pertaining to one or more of one or more process deviations, one or more key performance indicator failures, and one or more outcome-related impacts.

9. The computer-implemented method of claim 1, wherein analyzing data related to the given enterprise comprises analyzing data pertaining to one or more of user information, role information, activity log information, volume information, and context information.

10. A non-transitory processor-readable storage medium having stored therein program code of one or more software programs, wherein the program code when executed by at least one processing device causes the at least one processing device:
 to determine, in connection with at least one process of a given enterprise, one or more process requirements by analyzing data related to the at least one process and data related to the given enterprise;
 to generate a recommendation of one or more process capabilities to be incorporated into the at least one process by processing, using one or more neural networks, at least a portion of the data related to the at least one process and data related to the one or more determined process requirements, and calculating, using at least a portion of the one or more neural networks and one or more multivariate regression techniques, weightings of multiple process capabilities in relation to one or more designated process-related variables;
 to forecast behavior of the at least one process, in conjunction with at least a portion of the one or more recommended process capabilities and at least a portion of the calculated weightings, by performing at least one simulation of the at least one process incorporating the at least a portion of the one or more recommended process capabilities in association with one or more process performance metrics, and predicting one or more process behavior outcome measures by processing the one or more process performance metrics using the one or more neural networks;
 to automatically generate one or more modified versions of the at least one process, based at least in part on the forecasting, by migrating, from at least one automated code development system, one or more feature sets into one or more portions of code associated with the at least one process, in at least one automated testing system, and incorporating the at least a portion of the one or more recommended process capabilities into at least a portion of the one or more modified versions of the at least one process based at least in part on the at least one simulation;
 to test the one or more modified versions of the at least one process by performing one or more simulations of the one or more modified versions; and
 to deploy, to at least one processing environment associated with the given enterprise, at least one of the one or more modified versions of the at least one process based at least in part on the testing.

11. The non-transitory processor-readable storage medium of claim 10, wherein the one or more neural networks comprise at least one extreme learning machine (ELM) neural network.

12. The non-transitory processor-readable storage medium of claim 10, wherein the program code when executed by the at least one processing device further causes the at least one processing device:
 to train the one or more neural networks based at least in part on the testing of the one or more modified versions of the at least one process.

13. An apparatus comprising:
 at least one processing device comprising a processor coupled to a memory;
 the at least one processing device being configured:
  to determine, in connection with at least one process of a given enterprise, one or more process requirements by analyzing data related to the at least one process and data related to the given enterprise;
  to generate a recommendation of one or more process capabilities to be incorporated into the at least one process by processing, using one or more neural networks, at least a portion of the data related to the at least one process and data related to the one or more determined process requirements, and calculating, using at least a portion of the one or more neural networks and one or more multivariate regression techniques, weightings of multiple process capabilities in relation to one or more designated process-related variables;
  to forecast behavior of the at least one process, in conjunction with at least a portion of the one or more recommended process capabilities and at least a portion of the calculated weightings, by performing at least one simulation of the at least one process incorporating the at least a portion of the one or more recommended process capabilities in association with one or more process performance metrics, and predicting one or more process behavior outcome measures by processing the one or more process performance metrics using the one or more neural networks;
  to automatically generate one or more modified versions of the at least one process, based at least in part on the forecasting, by migrating, from at least one automated code development system, one or more feature sets into one or more portions of code associated with the at least one process, in at least one automated testing system, and incorporating the at least a portion of the one or more recommended process capabilities into at least a portion of the one or more modified versions of the at least one process based at least in part on the at least one simulation;

to test the one or more modified versions of the at least one process by performing one or more simulations of the one or more modified versions; and to deploy, to at least one processing environment associated with the given enterprise, at least one of the one or more modified versions of the at least one process based at least in part on the testing.

14. The apparatus of claim 13, wherein the one or more neural networks comprise at least one extreme learning machine (ELM) neural network.

15. The apparatus of claim 13, wherein forecasting behavior of the at least one process comprises generating and outputting, to one or more of at least one system of the given enterprise and one or more entities within the given enterprise, feedback responsive to the at least one simulation.

16. The apparatus of claim 13, wherein determining one or more process requirements comprises determining multiple process requirements and weighting at least a given one of the multiple determined process requirements relative to one or more other ones of the multiple determined process requirements based at least in part on activity volume information related to determined process requirements.

17. The apparatus of claim 13, wherein testing the one or more modified versions of the at least one process comprises predicting one or more user experience impacts as a result of at least a portion of the one or more migrated feature sets.

18. The apparatus of claim 13, wherein testing the one or more modified versions of the at least one process comprises identifying one or more bottlenecks in execution of at least one of the one or more modified versions of the at least one process.

19. The apparatus of claim 13, wherein analyzing data related to the at least one process comprises analyzing data pertaining to one or more of one or more process deviations, one or more key performance indicator failures, and one or more outcome-related impacts.

20. The apparatus of claim 13, wherein analyzing data related to the given enterprise comprises analyzing data pertaining to one or more of user information, role information, activity log information, volume information, and context information.

* * * * *